(12) United States Patent
Ozawa

(10) Patent No.: US 11,812,560 B2
(45) Date of Patent: Nov. 7, 2023

(54) COMPUTER-READABLE RECORDING MEDIUM STORING DESIGN PROGRAM, DESIGN METHOD, AND PRINTED WIRING BOARD

(71) Applicant: FUJITSU LIMITED, Kawasaki (JP)

(72) Inventor: Toshiaki Ozawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 17/683,741

(22) Filed: Mar. 1, 2022

(65) Prior Publication Data

US 2022/0386471 A1 Dec. 1, 2022

(30) Foreign Application Priority Data

Jun. 1, 2021 (JP) .................................. 2021-092128

(51) Int. Cl.
| | |
|---|---|
| H05K 3/00 | (2006.01) |
| H05K 1/11 | (2006.01) |
| G06F 30/394 | (2020.01) |
| H05K 1/02 | (2006.01) |
| G06F 115/12 | (2020.01) |

(52) U.S. Cl.
CPC ......... H05K 3/0005 (2013.01); G06F 30/394 (2020.01); H05K 1/0228 (2013.01); H05K 1/115 (2013.01); G06F 2115/12 (2020.01)

(58) Field of Classification Search
None
See application file for complete search history.

(56) References Cited

U.S. PATENT DOCUMENTS

| | | | | |
|---|---|---|---|---|
| 2001/0044709 A1* | 11/2001 | Fujimori | ............... | G06F 30/367 703/2 |
| 2003/0074638 A1* | 4/2003 | Osaka | ................... | G06F 30/367 716/102 |
| 2006/0143581 A1* | 6/2006 | Ishikawa | ............... | G06F 30/367 716/115 |
| 2008/0250366 A1* | 10/2008 | Ishikawa | ............... | G06F 30/398 716/106 |
| 2010/0321060 A1 | 12/2010 | Nishio et al. | | |

FOREIGN PATENT DOCUMENTS

| | | |
|---|---|---|
| JP | 2009-081378 A | 4/2009 |
| JP | 2011-004038 A | 1/2011 |
| JP | 2012-516021 A | 7/2012 |
| JP | 2013-120445 A | 6/2013 |
| WO | WO 2010/085376 A2 | 7/2010 |

* cited by examiner

Primary Examiner — Timothy J Thompson
Assistant Examiner — John B Freal
(74) Attorney, Agent, or Firm — STAAS & HALSEY LLP

(57) ABSTRACT

A design program for causing a computer to execute a process including: selecting, based on design data of a printed wiring board, a first transmission line and a second transmission line among transmission lines provided in the printed wiring board; adjusting a first wiring length between a first via in the first transmission line and a third via in the first transmission line, a second wiring length between a second via in the second transmission line and a fourth via in the second transmission line, a length of the first via, a length of the second via, a length of the third via, or a length of the fourth via such that a phase of first crosstalk noise generated between the first via and the second via is inverted between the third via and the fourth via; and outputting the design data corrected based on the adjustment in the board.

10 Claims, 14 Drawing Sheets

COMPUTER-READABLE RECORDING MEDIUM STORING DESIGN PROGRAM, DESIGN METHOD, AND PRINTED WIRING BOARD

CROSS-REFERENCE TO RELATED APPLICATION

This application is based upon and claims the benefit of priority of the prior Japanese Patent Application No. 2021-92128, filed on Jun. 1, 2021, the entire contents of which are incorporated herein by reference.

FIELD

The embodiments discussed herein are related to a computer-readable recording medium storing a design program, a design method, and a printed wiring board.

BACKGROUND

In a printed wiring board over which a plurality of electronic components are mounted, a plurality of vias electrically coupled to a plurality of coupling terminals of the individual electronic components are formed as part of transmission lines between the individual electronic components.

Crosstalk noise may be generated between adjacent vias among the plurality of vias described above, which may cause malfunction of an electronic product including the printed wiring board.

In the related art, there is a technique in which phases of signals in respective transmission lines of a printed wiring board are adjusted by a phase adjustment circuit provided in a transmission-side electronic component so that edges of the signals do not overlap each other between the individual transmission lines, thereby reducing noise caused by wiring length resonance.

In the related art, there is a technique in which by using a difference in propagation delay time between a surface layer wiring and an inner layer wiring of a printed wiring board, a distribution of length of the surface layer wiring is made different between adjacent transmission lines so as to shift edges of signals from each other, thereby reducing jitter caused by crosstalk.

In the related art, there is a technique in which values of inductive coupling and capacitive coupling between adjacent transmission lines over a printed wiring board are calculated, and based on the calculation results, capacitors to be added between the adjacent transmission lines are selected or the like, thereby reducing an influence of crosstalk.

However, these techniques do not reduce the crosstalk noise itself.

By contrast, in the related art, there is a technique in which a phase of crosstalk noise generated in one portion of two mounting portions on a transmission side and a reception side in a printed wiring board is set to an opposite phase of crosstalk noise generated in the other portion, thereby canceling crosstalk noise each other. In order to generate crosstalk noise in an opposite phase, in one of transmission-side and reception-side electronic components in which a plurality of pairs each including a positive terminal and a negative terminal are arranged adjacently to each other, the arrangement of the positive terminal and the arrangement of the negative terminal in one pair among the adjacent pairs are switched with each other. In addition, two transmission lines (differential signal line pair) coupled to these terminals are also crossed.

Examples of the related art include as follows: Japanese Laid-open Patent Publication No. 2011-4038; Japanese Laid-open Patent Publication No. 2009-81378; Japanese Laid-open Patent Publication No. 2013-120445; and Japanese National Publication of International Patent Application No. 2012-516021.

SUMMARY

According to an aspect of the embodiments, there is provided a non-transitory computer-readable recording medium storing a design program for causing a computer to execute a process, the process including: selecting, based on design data of a printed wiring board stored in a storage unit, a first transmission line and a second transmission line among a plurality of transmission lines provided in the printed wiring board; adjusting a first wiring length between a first via included in the first transmission line and a third via included in the first transmission line, a second wiring length between a second via included in the second transmission line and a fourth via included in the second transmission line, a length of the first via, a length of the second via, a length of the third via, or a length of the fourth via such that a phase of first crosstalk noise generated between the first via and the second via is inverted between the third via and the fourth via; and outputting the design data corrected based on the adjustment in the printed wiring board.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, crosstalk noise may not be reduced by the above-described technique for switching the arrangement of the positive terminal with the arrangement of the negative terminal in some cases.

For example, a case is considered where two pairs of positive and negative terminals are arranged adjacently to each other in a transmission-side electronic component and crosstalk noise is generated and where two pairs of positive and negative terminals in a reception-side electronic component, which are electrically coupled to these pairs of positive and negative terminals in the transmission-side electronic component, are separated from each other. In this case, even if the positive and negative terminals of one of the two pairs in the reception-side electronic component are switched with each other, crosstalk in an opposite phase may not be generated and crosstalk noise may not be canceled in some cases. Also in a case where an electronic component in which the arrangements of the positive and negative terminals are not changeable is used, the above-described technique of the related art is not applicable.

In one aspect, an object of the present disclosure is to provide a design program, a design method, and a printed wiring board that are capable of reducing crosstalk noise.

Hereinafter, embodiments of the present disclosure will be described with reference to the drawings.

First Embodiment

Figure 1:
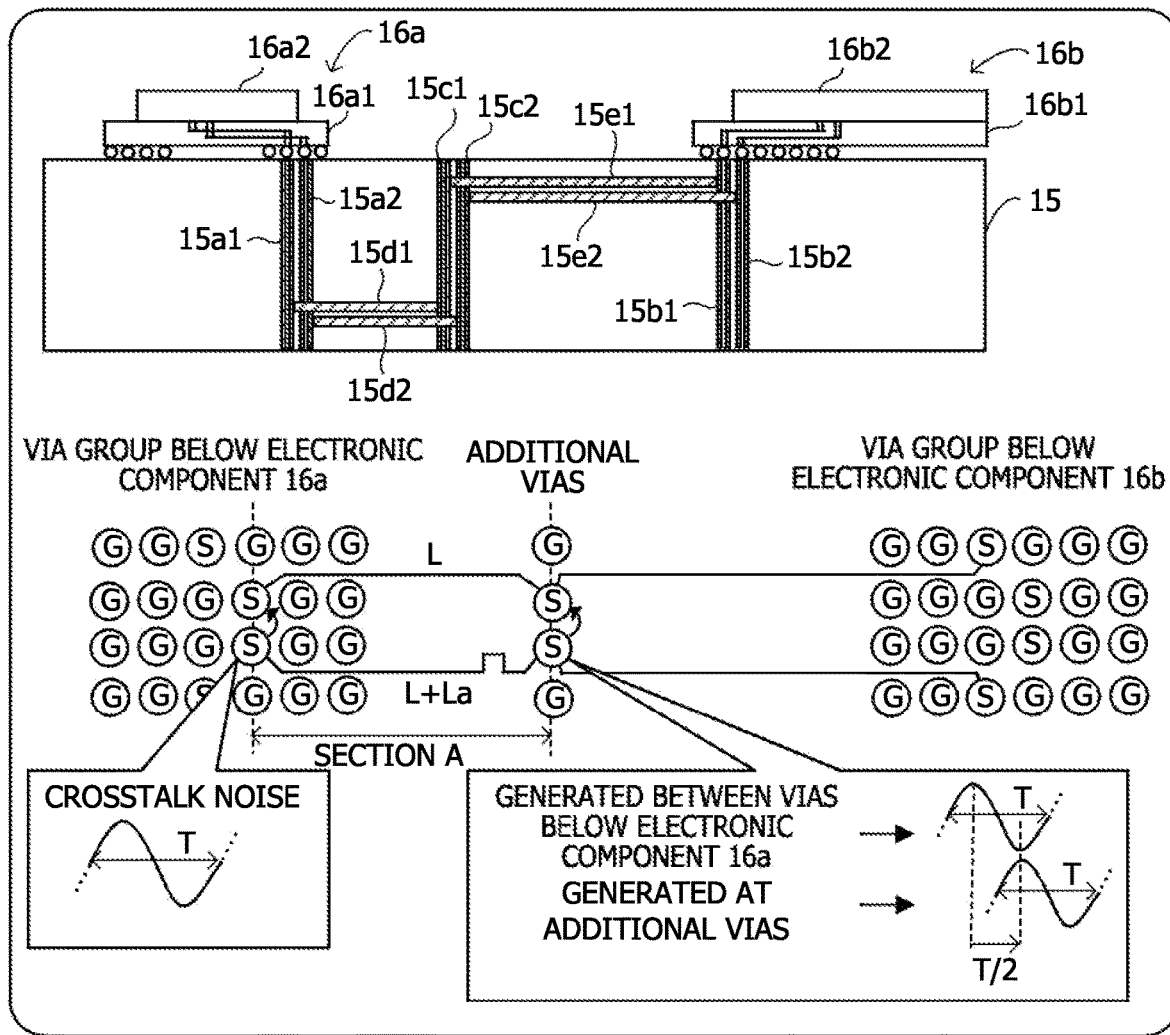
FIG. 1 illustrates an example of a design method and a printed wiring board according to a first embodiment.

FIG. 1 is a diagram illustrating an example of a design method and a printed wiring board according to a first embodiment.

The design method according to the first embodiment is executed by, for example, a design apparatus 10 as illustrated in FIG. 1.

The design apparatus 10 includes a storage unit 11 and a processing unit 12.

The storage unit 11 is a volatile storage device such as a random-access memory (RAM) or a non-volatile storage device such as a hard disk drive (HDD) or a flash memory, for example.

The storage unit 11 stores design data 11a of the printed wiring board over which a plurality of electronic components are mounted. For example, the design data 11a is computer aided design (CAD) data including information on arrangement, shapes, and physical property values (resistivity and the like) of wirings, vias, terminals, and the like, and is generated in advance in accordance with a predetermined design rule.

The design apparatus 10 may receive an input by a user and create the design data 11a based on the input, or the design apparatus 10 may acquire the design data 11a generated by another information processing apparatus.

For example, the processing unit 12 may be implemented by a processor that is a piece of hardware such as a central processing unit (CPU), a graphics processing unit (GPU), or a digital signal processor (DSP). However, the processing unit 12 may include an electronic circuit such as an application-specific integrated circuit (ASIC) or a field-programmable gate array (FPGA). The processor executes a program stored in a memory such as a RAM. For example, a design program is executed. A set of a plurality of processors may be referred to as a "multiprocessor" or simply a "processor".

In order to reduce crosstalk noise generated between vias each included in a corresponding one of a plurality of transmission lines that electrically couple a first electronic component and a second electronic component to each other, the processing unit 12 adjusts the length of one of the transmission lines in the following manner.

Based on the design data 11a, the processing unit 12 selects a first transmission line and a second transmission line among the plurality of transmission lines each including a via. For example, the processing unit 12 selects two transmission lines electrically coupled to two adjacent coupling terminals (for example, solder bumps) of the first electronic component, via each of which a signal is transmitted. This is because crosstalk noise is likely to be generated between two adjacent vias that are electrically coupled to these two adjacent coupling terminals and are provided in the printed wiring board below the first electronic component.

The processing unit 12 may identify, by a simulation, the first transmission line and the second transmission line in which crosstalk noise having a magnitude equal to or greater than a reference value is generated between the two vias, and may select the first transmission line and the second transmission line. Based on actual measurement values of prototypes manufactured based on the design data 11a, the processing unit 12 may identify the first transmission line and the second transmission line in which crosstalk noise having a magnitude equal to or greater than a reference value may be generated between the two vias, and may select the first transmission line and the second transmission line.

For example, the processing unit 12 identifies a period of crosstalk noise generated between the two vias by a simulation. The period of the crosstalk noise may be identified based on actual measurement values of a prototype manufactured based on the design data 11a. The processing unit 12 may receive an input of a frequency of crosstalk to be reduced from a user, and identify the period from the frequency.

The processing unit 12 adjusts a length of the first transmission line or the second transmission line in a following manner. Hereinafter, among two vias between which crosstalk noise is generated, a via included in the first transmission line is referred to as a first via, and a via included in the second transmission line is referred to as a second via.

The processing unit 12 adjusts a wiring length between the first via and a third via that is included in the first transmission line or a wiring length between the second via and a fourth via that is included in the second transmission line so that a phase of crosstalk noise generated between the first and second vias is inverted between the third via and the fourth via.

For example, the processing unit 12 performs adjustment so that a difference between the wiring lengths is equal to a value obtained by dividing a value of half of the period of the crosstalk noise by a propagation delay time per unit length of a signal propagating between the first via and the third via or between the second via and the fourth via.

In a case where there are two vias electrically coupled to two adjacent coupling terminals for receiving a signal in the second electronic component and provided in the printed wiring board below the second electronic component, there is a possibility that crosstalk noise may be generated between these vias. Accordingly, the third via and the fourth via may be these vias.

In a case where there are not such two vias described above, the third via is added to the first transmission line, the fourth via adjacent to the third via is added to the second transmission line, and crosstalk noise is generated between the two additional vias.

FIG. 1 illustrates a schematic diagram of a printed wiring board 15 as an example of a design target to which vias are added. Electronic components 16a and 16b are mounted over the printed wiring board 15.

For example, the electronic components 16a and 16b are ball grid array (BGA) packages. The electronic component 16a includes a package substrates 16a1 and a semiconductor chip (die) 16a2, and the electronic component 16b includes a package substrate 16b1 and a semiconductor chip (die) 16b2. Each of the electronic components 16a and 16b is mounted over the printed wiring board 15 with solder bumps that are an example of coupling terminals.

A plurality of vias electrically coupled to a plurality of solder bumps of the electronic components 16a and 16b are formed below the electronic components 16a and 16b in the printed wiring board 15. FIG. 1 illustrates some of the plurality of vias. Vias 15a1 and 15a2 are formed below the electronic component 16a, and vias 15b1 and 15b2 are formed below the electronic component 16b.

In the example of FIG. 1, vias 15c1 and 15c2 are added. The via 15c1 is added to a transmission line including the vias 15a1 and 15b1, and the via 15c2 is added to a transmission line including the vias 15a2 and 15b2.

Due to the addition of the via 15c1, a wiring coupling the via 15a1 and the via 15b1 to each other includes a wiring 15d1 coupling the via 15a1 and the via 15c1 to each other and a wiring 15e1 coupling the via 15c1 and the via 15b1 to each other. Due to the addition of the via 15c2, a wiring coupling the via 15a2 and the 15b2 to each other includes a wiring 15d2 coupling the via 15a2 and the via 15c2 to each other and a wiring 15e2 coupling the via 15c2 and the via 15b2 to each other.

FIG. 1 schematically illustrates a via group formed below the electronic components 16a and 16b and the added vias. "G" represents a via that has a ground potential, and "S" represents a via through which a signal propagates.

In the example of FIG. 1, an example in which crosstalk noise of a period T is generated between two vias, through which signals propagate, below the electronic component 16a is illustrated. For example, a signal propagating through a via represented by "S" on the lower side is an aggressor, and a signal propagating through a via represented by "S" on the upper side is a victim.

In the via group below the electronic component 16b, the vias (two vias represented by "S") through which the above-described signals propagate are not adjacent to each other as illustrated in FIG. 1 (two vias represented by "G" are arranged between the two vias represented by "S"). In this case, since there is a possibility that crosstalk noise for canceling the crosstalk noise generated between the vias below the electronic component 16a may not be generated between these vias, additional vias are provided. In the example of FIG. 1, the additional vias include two adjacent vias through which signals propagated and two vias that have a ground potential.

In the example of FIG. 1, when a wiring length of one of two wirings coupling the two vias through which signals propagate below the electronic component 16a and the two additional vias to each other is denoted by L, a wiring length of the other is denoted by L+La. For example, as described above, La is a value obtained by dividing a value of half of the period of the crosstalk noise by the above-described propagation delay time per unit length.

As a result, a phase of crosstalk noise generated between the two vias below the electronic component 16a is opposite to a phase of crosstalk noise generated between the two additional vias, and the crosstalk noise thus may be canceled or reduced. Such a method may also be referred to as a method of canceling crosstalk noise by causing resonance to be included in the crosstalk characteristics at a frequency of crosstalk noise having an identified period.

By adding vias, crosstalk noise may be canceled or reduced in a desired section A. For example, by providing two additional vias near the two vias that are a source of generating crosstalk noise, the influence of crosstalk noise on signal propagation may be further suppressed, and the transmission efficiency thus may be improved.

Although the method of canceling or reducing the crosstalk noise between the vias included in the two transmission lines has been described in the above-described example, the above-described method may be similarly applied to another pair of transmission lines.

When the semiconductor chips 16a2 and 16b2 are regarded as the two electronic components, the wiring length adjustment described above may be performed between the plurality of vias included in the two transmission lines between the semiconductor chips 16a2 and 16b2. In such a case, the package substrates 16a1 and 16b1 may also be regarded as a part of the printed wiring board, and lengths of the wirings formed in the package substrates 16a1 and 16b1 may also be adjusted. Additional vias may be provided in the package substrates 16a1 and 16b1.

Hereinafter, an outline flow of a design method according to the first embodiment is summarized in a flowchart.

Figure 2:
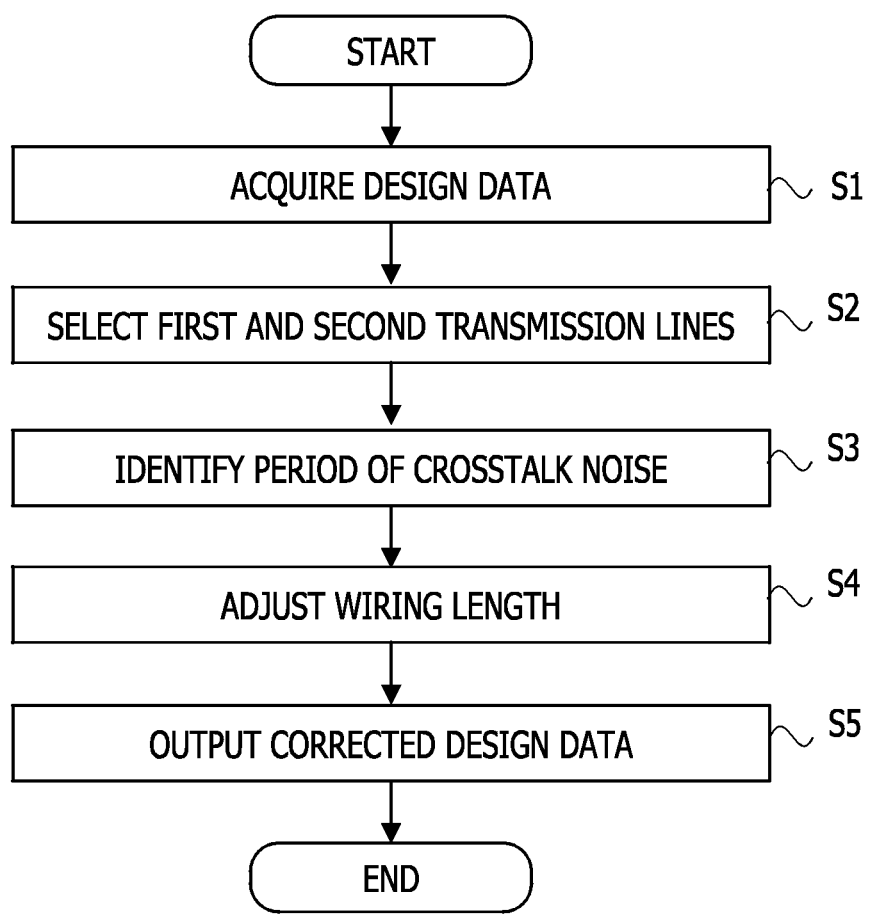
FIG. 2 is a flowchart illustrating an outline flow of the design method according to the first embodiment.

FIG. 2 is a flowchart illustrating the outline flow of the design method according to the first embodiment.

The processing unit 12 acquires (reads) the design data 11a from the storage unit 11 (step S1), and selects the first transmission line and the second transmission line described above (step S2). The processing unit 12 identifies a period of the crosstalk noise generated between the first via included in the first transmission line and the second via included in the second transmission line (step S3). The processing unit 12 adjusts the wiring length between the first and third vias or the wiring length between the second and fourth vias so that the phase of the crosstalk generated between the first and second vias is inverted between the third via and the fourth via (step S4). Thereafter, the processing unit 12 outputs the corrected design data obtained by performing the adjustment of the wiring lengths or the like (vias may be added as described above in some cases) (step S5), and ends the process. For example, the processing unit 12 may output the corrected design data to a display device (not illustrated) to display the corrected design data, or may output the corrected design data to the storage unit 11 to store the corrected design data. The processing unit 12 may transmit the corrected design data to an information processing apparatus outside the design apparatus 10 via a network.

The processing unit 12 may convert the design data into manufacturing data such as computer aided manufacturing (CAM) data and output the manufacturing data. The printed wiring board is manufactured by a manufacturing apparatus based on the manufacturing data.

The procedure of the process described above is an example. For example, the period of the crosstalk noise having the magnitude equal to or greater than the reference value is identified, and thereafter, the first transmission line and the second transmission line in which the crosstalk noise with the period is generated between the vias may be selected.

Second Embodiment

Next, a second embodiment will be described.

Figure 3:
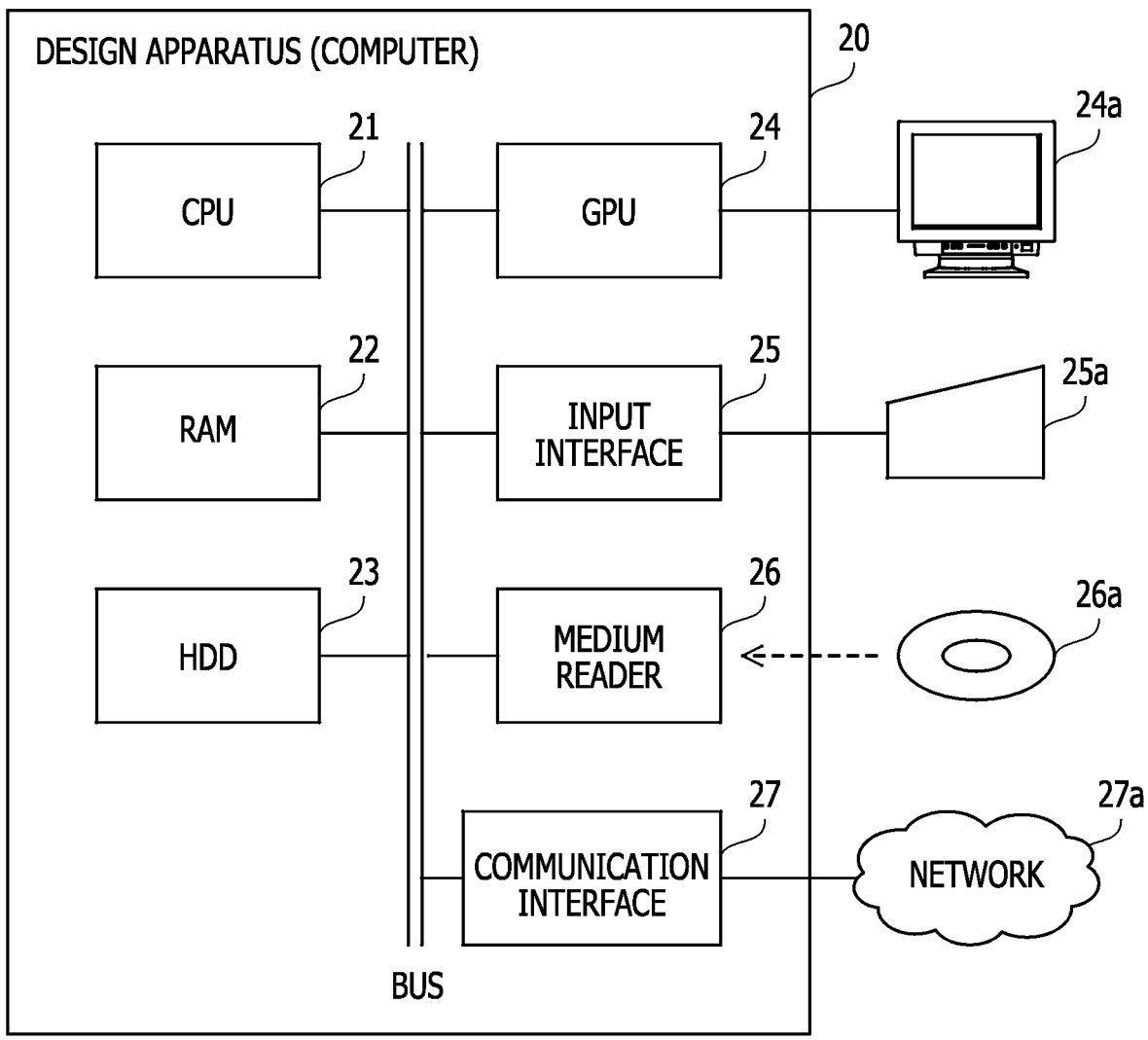
FIG. 3 is a block diagram illustrating an example of hardware of a design apparatus.

FIG. 3 is a block diagram illustrating an example of hardware of the design apparatus.

A design apparatus 20 may be implemented by a computer as illustrated in FIG. 3. The design apparatus 20 includes a CPU 21, a RAM 22, a HDD 23, a GPU 24, an input interface 25, a medium reader 26, and a communication interface 27. The above-described units are coupled to a bus.

The CPU 21 is a processor including an arithmetic circuit that executes commands in a program. The CPU 21 loads at least a part of a program and data stored in the HDD 23 into the RAM 22 and executes the program. The CPU 21 may include a plurality of processor cores or the design apparatus 20 may include a plurality of processors. Processes, which will be described below, may be executed in parallel by using the plurality of processors or processor cores. A set of the plurality of processors (multiprocessor) may be referred to as a "processor".

The RAM 22 is a volatile semiconductor memory that temporarily stores a program executed by the CPU 21 or data used for computation by the CPU 21. The design apparatus 20 may include a type of memory other than the RAM, and may include a plurality of memories.

The HDD 23 is a non-volatile storage device that stores a software program such as an operating system (OS), middleware, and application software, and data. Examples of the program include a design program for causing the design apparatus 20 to execute a process of designing the printed wiring board. The design apparatus 20 may include another type of storage device such as a flash memory or a solid-state drive (SSD), and may include a plurality of non-volatile storage devices.

The GPU 24 outputs images to a display 24a coupled to the design apparatus 20 in accordance with a command from the CPU 21. As the display 24a, a cathode ray tube (CRT) display, a liquid crystal display (LCD), a plasma display panel (PDP), an organic electro-luminescence (OEL) display, or the like may be used.

The input interface 25 acquires an input signal from an input device 25a coupled to the design apparatus 20 and outputs the input signal to the CPU 21. As the input device 25a, a pointing device such as a mouse, a touch panel, a touchpad, or a trackball; a keyboard; a remote controller; a button switch; or the like may be used. A plurality of types of input devices may be coupled to the design apparatus 20.

The medium reader 26 is a reading device that reads a program or data recorded on a recording medium 26a. As the recording medium 26a, for example, a magnetic disk, an optical disk, a magneto-optical (MO) disk, a semiconductor memory, or the like may be used. Examples of the magnetic disk include a flexible disk (FD) and an HDD. Examples of the optical disk include a compact disc (CD) and a Digital Versatile Disc (DVD).

For example, the medium reader 26 copies a program or data read from the recording medium 26a to another recording medium such as the RAM 22 or the HDD 23. For example, the read program is executed by the CPU 21. The recording medium 26a may be a portable recording medium, and may be used to distribute a program or data. The recording medium 26a and the HDD 23 may be referred to as computer-readable recording media.

The communication interface 27 is an interface that is coupled to a network 27a and that communicates with another information processing apparatus via the network 27a. The communication interface 27 may be a wired communication interface coupled to a communication device such as a switch by a cable, or may be a wireless communication interface coupled to a base station via a wireless link.

Next, functions and process procedures of the design apparatus 20 will be described.

Figure 4:
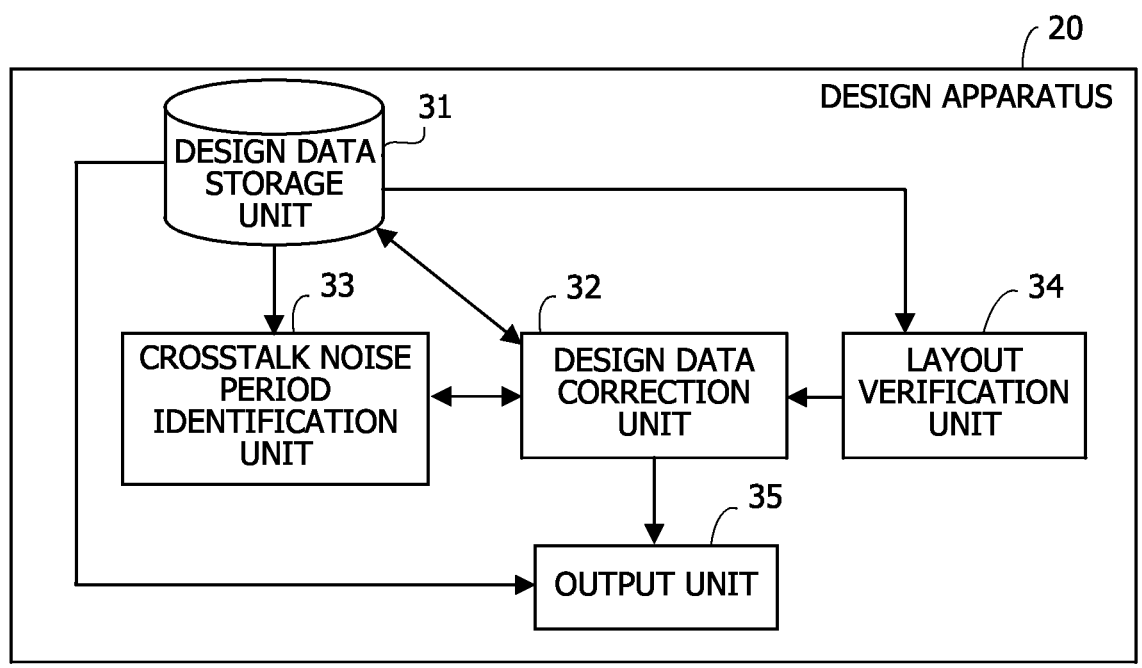
FIG. 4 is a block diagram illustrating an example of functions of the design apparatus.

FIG. 4 is a block diagram illustrating an example of functions of the design apparatus.

The design apparatus 20 includes a design data storage unit 31, a design data correction unit 32, a crosstalk noise period identification unit 33, a layout verification unit 34, and an output unit 35. The design data storage unit 31 may be implemented by using, for example, a storage area allocated in the RAM 22 or the HDD 23. The design data correction unit 32, the crosstalk noise period identification unit 33, the layout verification unit 34, and the output unit 35 may be implemented by using, for example, a program module executed by the CPU 21.

The design data storage unit 31 stores the design data 11a of the printed wiring board over which a plurality of electronic components are mounted. For example, the design data 11a is CAD data including information on arrangement, shapes, and physical property values (resistivity and the like) of wirings, vias, terminals, and the like, and generated in advance in accordance with a predetermined design rule.

The design data correction unit 32 performs correction of design data, for example, correction of a wiring length for reducing crosstalk noise.

The crosstalk noise period identification unit 33 identifies a period of crosstalk noise to be reduced by a simulation or the like.

The layout verification unit 34 performs layout verification, for example, design rule checking (DRC), layout versus schematic (LVS), or the like on the design data or the corrected design data.

The output unit 35 outputs the corrected design data. The output unit 35 may convert the corrected design data into manufacturing data such as CAM data and output the manufacturing data.

Figure 5:
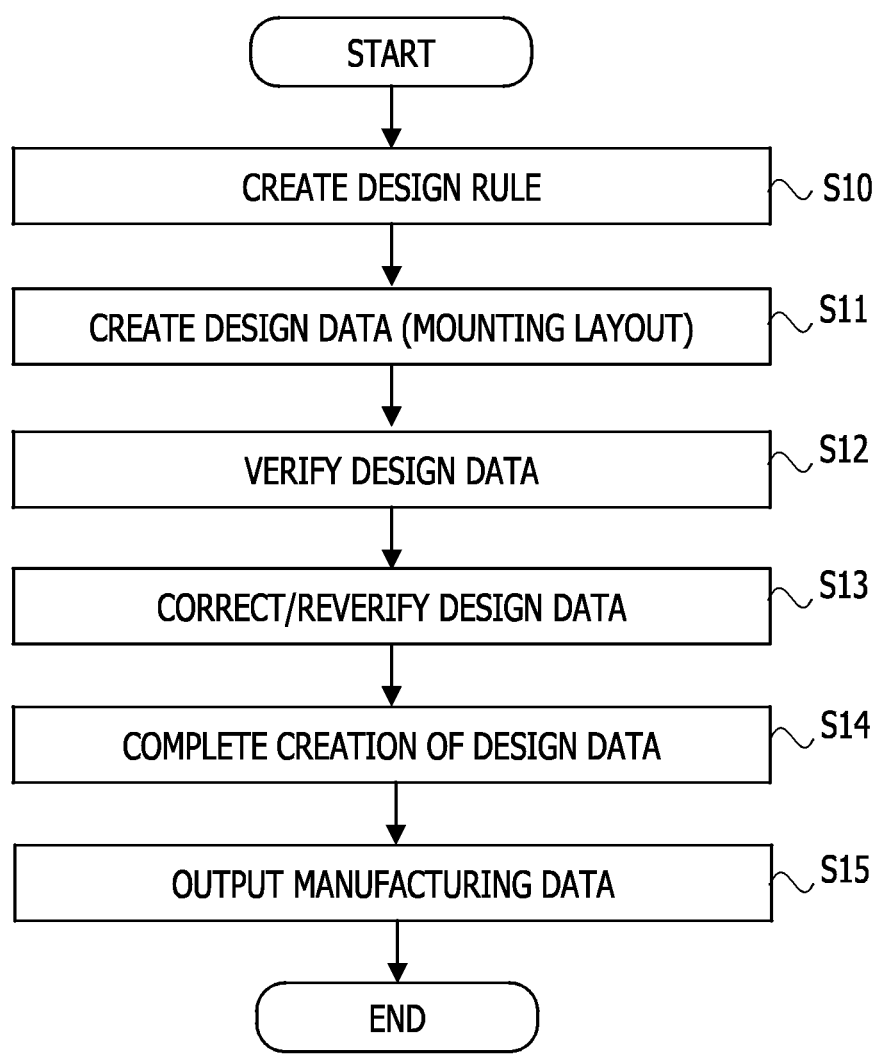
FIG. 5 is a flowchart illustrating an outline flow of a design procedure of the printed wiring board.

FIG. 5 is a flowchart illustrating an outline flow of a design procedure of the printed wiring board.

First, a design rule of the printed wiring board is created (step S10). Design data (mounting layout) including arrangement of components over the printed wiring board, wirings, and the like is created with the CAD in accordance with the design rule (step S11). Thereafter, the design data is verified by layout verification such as DRC or LVS (step S12). According to the verification result, the design data is corrected and reverified (step S13). For example, in a case where the verification result is acceptable, the creation of the design data is completed (step S14). Thereafter, the manufacturing data based on the design data is output (step S15).

Among the processing in each of the above-described steps, the design apparatus 20 performs at least the processing of step S13.

Figure 6:
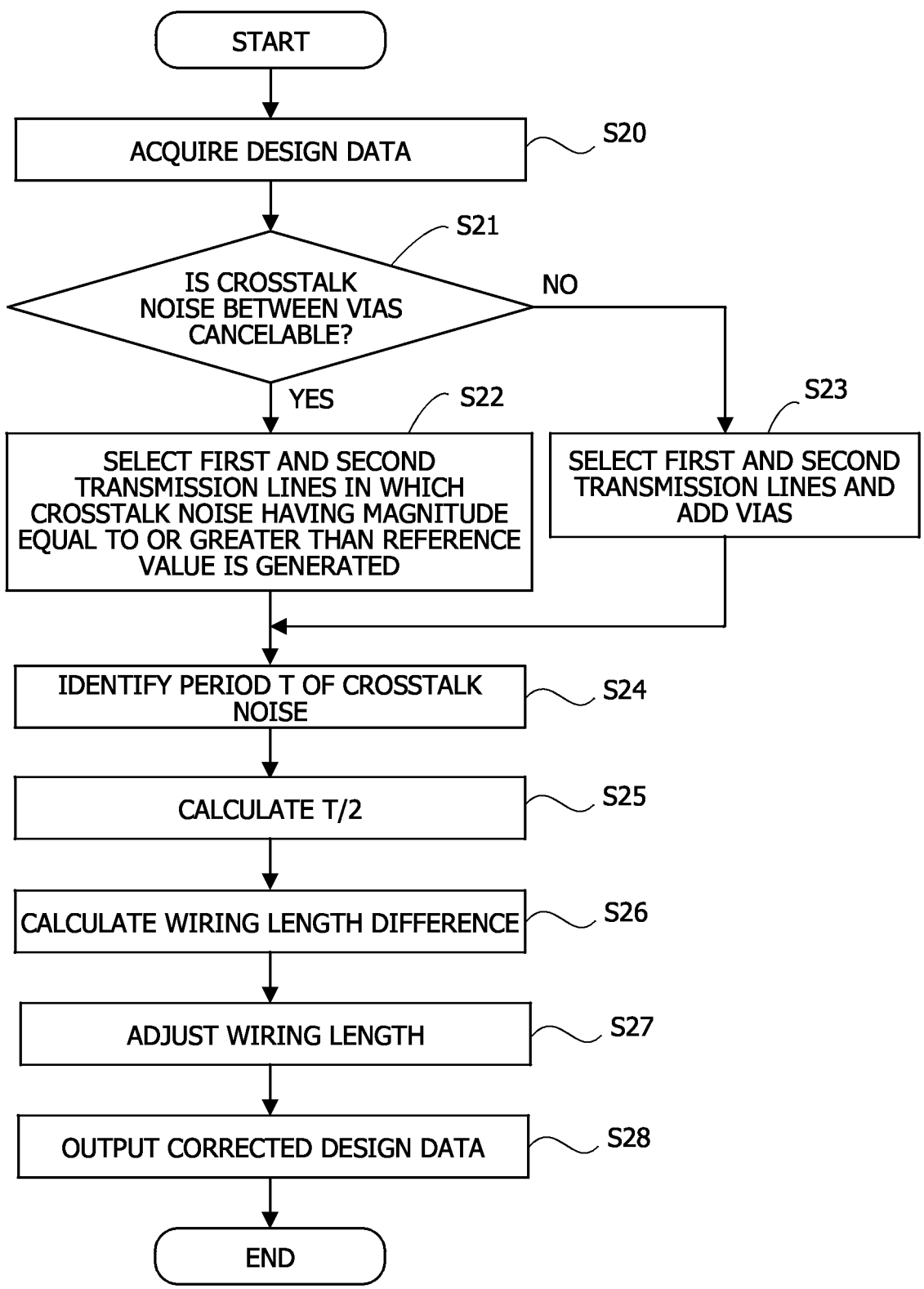
FIG. 6 is a flowchart illustrating a flow of an example of a design data correction process.

FIG. 6 is a flowchart illustrating a flow of an example of a design data correction process.

The design data correction unit 32 acquires (reads) the design data from the design data storage unit 31 (step S20). Based on the design data, the design data correction unit 32 determines whether or not a plurality of vias are present in the transmission line coupling the two electronic components mounted over the printed wiring board to each other and crosstalk noise is cancelable between the vias (step S21).

The case where crosstalk noise is cancelable between the vias is, for example, a case where manners in which the plurality of coupling terminals are arranged in the transmission-side electronic component and in the reception-side electronic component mounted over the printed wiring board are the same (see FIG. 9 described later) or the like.

In a case where it is determined that the crosstalk noise is cancelable between the vias, the design data correction unit 32 performs processing of step S22. In a case where it is determined that the crosstalk noise is not cancelable between the vias, the design data correction unit 32 performs processing of step S23.

In the processing of step S22, for example, the design data correction unit 32 identifies, by a simulation, the first transmission line and the second transmission line in which crosstalk noise having a magnitude equal to or greater than a reference value is generated between the two vias, and selects the first transmission line and the second transmission line. Based on actual measurement values of a prototype manufactured based on the design data, the design data correction unit 32 may identify the first transmission line and the second transmission line in which crosstalk noise having a magnitude equal to or greater than the reference value may be generated between the two vias, and may select the first transmission line and the second transmission line.

Similarly to the description of the first embodiment, hereinafter, among two vias between which crosstalk noise is generated, a via included in the first transmission line is referred to as the first via, and a via included in the second transmission line is referred to as the second via. Another via included in the first transmission line is referred to as the third via, and another via included in the second transmission line and adjacent to the third via is referred to as the fourth via.

In the processing of step S23, for example, the design data correction unit 32 selects the first transmission line and the second transmission line as in the processing of step S22, and adds one via to each of the first transmission line and the second transmission line. The two vias to be added are arranged adjacently to each other. Hereinafter, in a case where the processing of step S23 is performed, the via added to the first transmission line is referred to as the third via, and the via added to the second transmission line is referred to as the fourth via.

After the processing of steps S22 and S23, the crosstalk noise period identification unit 33 identifies a period (T) of crosstalk noise generated between the first via and the second via by, for example, a simulation (step S24). For example, a method in which is used in which a signal is propagated through only one of the first transmission line and the second transmission line and crosstalk noise propagating through the other of the first transmission line and the second transmission line is measured, or the like is used.

The period of the crosstalk noise may be identified based on the actual measurement values of the prototype manufactured based on the design data. The crosstalk noise period identification unit 33 may receive an input of a frequency of crosstalk to be reduced from a user, and identify the period from the frequency.

Thereafter, the design data correction unit 32 calculates T/2 (step S25). T/2 indicates a delay difference to be added between signals generating crosstalk noise.

The design data correction unit 32 calculates a wiring length difference to be added, between the wiring length between the first and third vias and the wiring length between the second and fourth vias, by dividing T/2 by a propagation delay time per unit length of a signal propagating between the first and third vias or between the second and fourth vias (step S26).

Based on the calculated wiring length difference, the design data correction unit 32 adjusts the wiring length between the first and third vias or between the second and fourth vias (step S27). The design data after the wiring length is adjusted (the corrected design data) is stored in, for example, the design data storage unit 31.

The output unit 35 outputs the corrected design data (step S28). Accordingly, the correction process is ended. For example, the output unit 35 may output and display the corrected design data on the display 24a, or may transmit the corrected design data to an information processing apparatus outside the design apparatus 20 via the network 27a.

The procedure of the process described above is an example, and the processing order may be appropriately changed.

Figure 7:
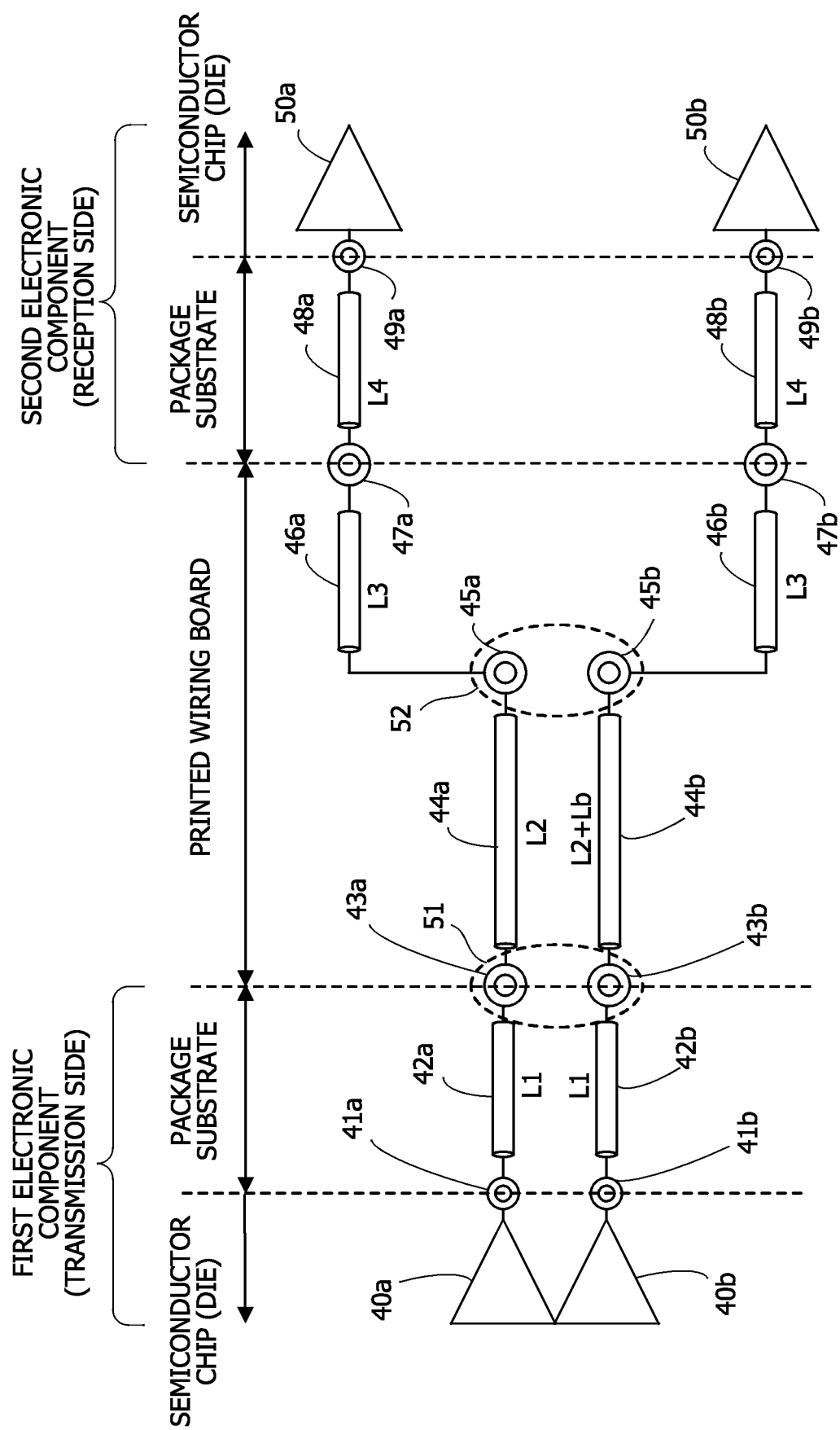
FIG. 7 illustrates an example in which wiring lengths are adjusted after vias are added.

FIG. 7 is a diagram illustrating an example in which the wiring length is adjusted after the vias are added.

FIG. 7 illustrates an example of two transmission lines used in a case where a single-ended signal is transmitted and received between a first electronic component (transmission side) and a second electronic component (reception side) mounted over the printed wiring board.

Each of the first electronic component and the second electronic component includes a semiconductor chip mounted over a package substrate. Signals transmitted by transmission circuits 40a and 40b that are included in the semiconductor chip of the first electronic component propagate to the printed wiring board through vias 41a and 41b and wirings 42a and 42b of the package substrate, respectively. The signals that have propagated to the printed wiring board propagate to the second electronic component through vias 43a and 43b, wirings 44a and 44b, additional vias 45a and 45b, wirings 46a and 46b, and vias 47a and 47b, respectively. The signals that have propagated to the second electronic component propagate to reception circuits 50a and 50b of the semiconductor chip through wirings 48a and 48b and vias 49a and 49b of the package substrate, respectively.

In FIG. 7, in a case where a location 51 where the via 43a and the via 43b are adjacent to each other is a location where crosstalk noise is generated, wiring lengths of the wirings 44a and 44b are adjusted in order to generate crosstalk noise in an opposite phase at a location 52 where the adjacent vias 45a and 45b are added. The arrangement is carried out such that a distance between the additional vias 45a and 45b is equal to a distance between the vias 43a and 43b, for example. The lengths of the additional vias 45a and 45b are the same as the lengths of the vias 43a and 43b, for example.

In the example of FIG. 7, Lb is added to the wiring 44b as a wiring length difference with respect to the wiring length (L2) before the adjustment of the wirings 44a and 44b. In FIG. 7, wiring lengths of the wirings 42a and 42b are denoted by L1 and equal to each other, wiring lengths of the wirings 46a and 46b are denoted by L3 and equal to each other, and wiring lengths of the wirings 48a and 48b are denoted by L4 and equal to each other.

For example, as described above, Lb that is the wiring length difference is a value obtained by dividing a value of half of the period of the crosstalk noise by a propagation delay time per unit length of a signal propagating through the wiring 44a or the wiring 44b.

Figure 8:
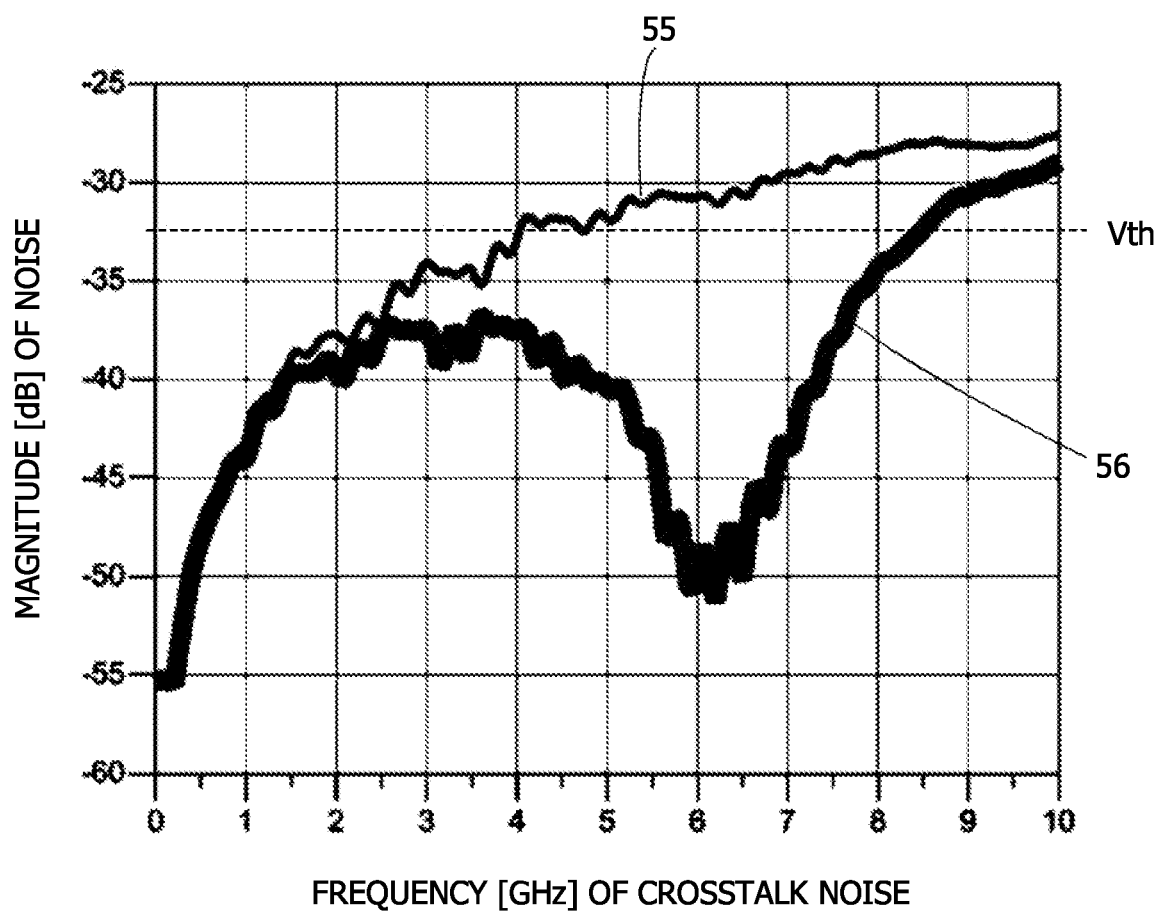
FIG. 8 illustrates an example of a crosstalk noise reduction result.

FIG. 8 is a diagram illustrating an example of a crosstalk noise reduction result. In FIG. 8, the horizontal axis represents a frequency [GHz] of crosstalk noise, and the vertical axis represents a magnitude [dB] of the noise.

A characteristic 55 indicates a characteristic before the crosstalk noise is reduced, and a characteristic 56 indicates a characteristic after the crosstalk noise is reduced.

For example, it is assumed that crosstalk noise having a magnitude equal to or greater than a reference value Vth is generated at the location 43a in FIG. 7, and frequency of the crosstalk noise desired to be reduced is 6 GHz.

In such a case, since T=166 ps, a delay difference to be added between signals propagating through the wirings 44a and 44b in order to cause resonance at 6 GHz is 166/2=83 ps. When the propagation delay per unit length is 6.5 ps/mm, the wiring length difference (Lb) is about 13 mm.

By adding such a wiring length difference between the wirings 44a and 44b, the crosstalk noise in 6 GHz may be reduced, for example, as indicated by the characteristic 56 in FIG. 8.

Figure 9:
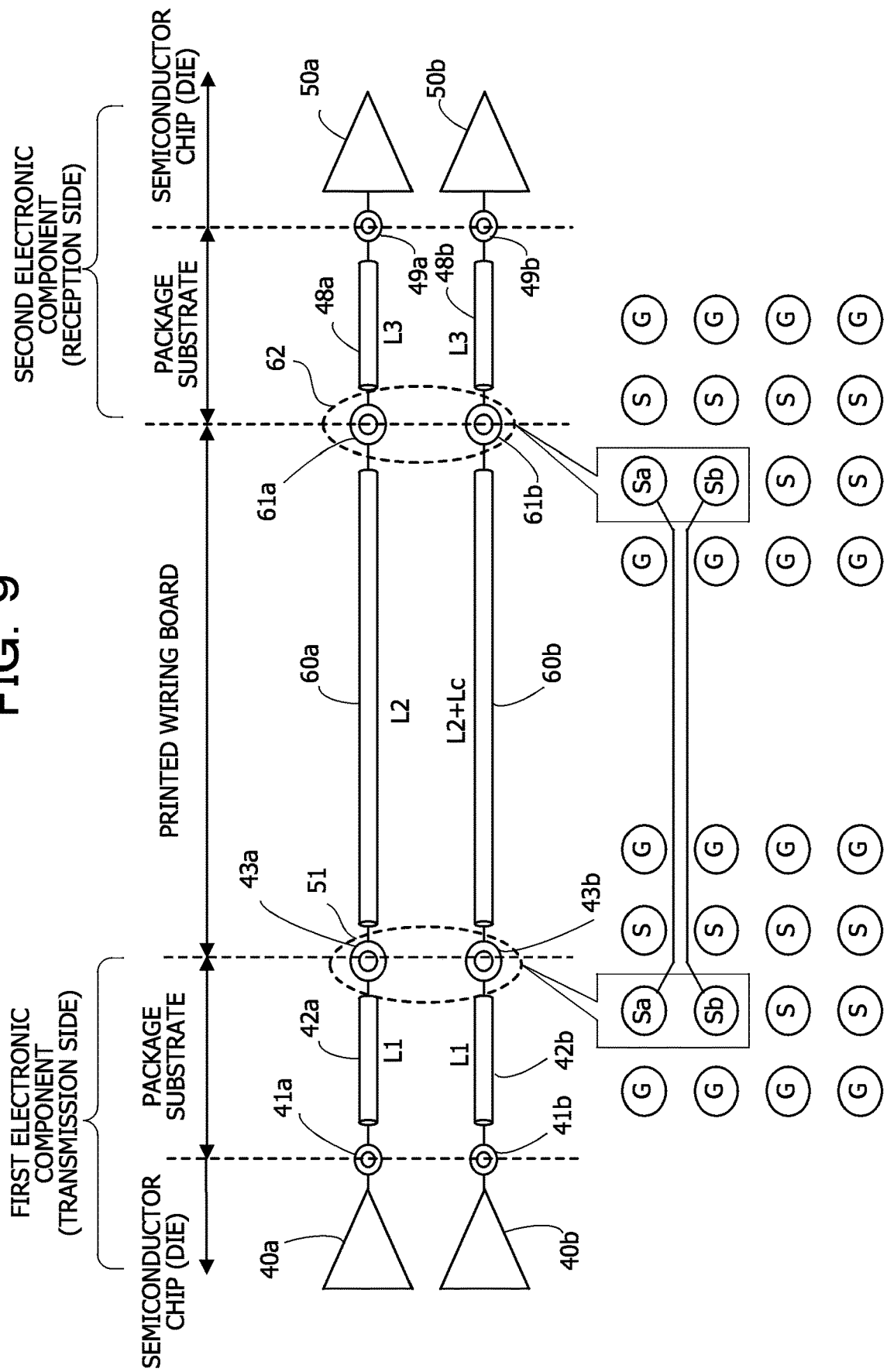
FIG. 9 illustrates a first example in which the wiring lengths are adjusted without adding vias.

FIG. 9 is a diagram illustrating a first example in which the wiring lengths are adjusted without adding vias. In FIG. 9, the same elements as the elements illustrated in FIG. 7 are assigned the same reference numerals. FIG. 9 schematically illustrates via groups formed below the transmission-side electronic component and the reception-side electronic component and additional vias. "G" represents a via that has a ground potential, "S" represents a via through which a signal propagates, and "Sa" and "Sb" represent vias included in the two selected transmission lines in the printed wiring board.

FIG. 9 illustrates an example of a case where manners in which a plurality of coupling terminals are arranged in the transmission-side electronic component and in the reception-side electronic component mounted over the printed wiring board are the same.

Each of the first electronic component and the second electronic component includes a semiconductor chip mounted over a package substrate. Signals transmitted by the transmission circuits 40a and 40b that are included in the semiconductor chip of the first electronic component propagate to the printed wiring board through the vias 41a and 41b and the wirings 42a and 42b of the package substrate, respectively. The signals that have propagated to the printed wiring board propagate to the second electronic component through the vias 43a and 43b, wirings 60a and 60b, and vias 61a and 61b, respectively. The signals that have propagated to the second electronic component propagate to the reception circuits 50a and 50b of the semiconductor chip through the wirings 48a and 48b and the vias 49a and 49b of the package substrate, respectively.

In FIG. 9, the wiring lengths of the wirings 60a and 60b are adjusted at a location 62 where the vias 61a and 61b below the second electronic component are adjacent to each other in order to generate crosstalk noise in an opposite phase to the crosstalk generated at the location 51.

In the example of FIG. 9, Lc is added to the wiring 60b as a wiring length difference with respect to the wiring length (L2) before the adjustment of the wirings 60a and 60b.

For example, as described above, Lc that is the wiring length difference is a value obtained by dividing a value of half of the period of the crosstalk noise by a propagation delay time per unit length of a signal propagating through the wiring 60a or the wiring 60b.

By adding such a wiring length difference, a phase of the crosstalk noise generated at the location 51 and a phase of the crosstalk noise generated at the location 62 are opposite to each other, and the crosstalk noise thus may be canceled or reduced.

Figure 10:
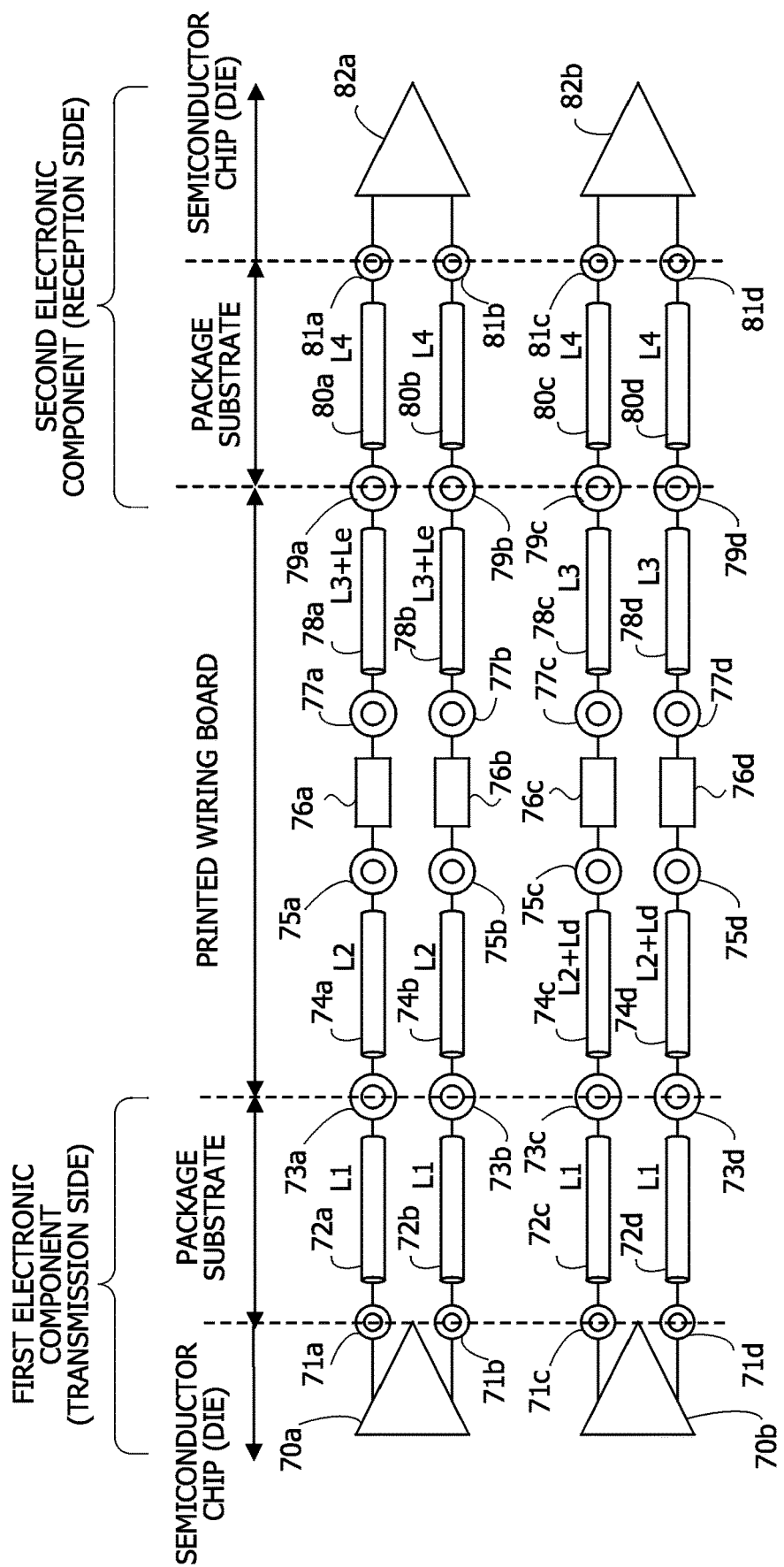
FIG. 10 illustrates a second example in which wiring lengths are adjusted without adding vias.

FIG. 10 is a diagram illustrating a second example in which the wiring lengths are adjusted without adding vias. FIG. 10 illustrates an example of two transmission lines (a pair of transmission lines to which two signals having opposite phases propagate is referred to as one transmission line) used in a case where a differential signal is transmitted and received between a first electronic component (transmission side) and a second electronic component (reception side) mounted over the printed wiring board.

Each of the first electronic component and the second electronic component includes a semiconductor chip mounted over a package substrate. Differential signals transmitted by transmission circuits 70a and 70b that are included in the semiconductor chip of the first electronic component propagate to the printed wiring board through vias 71a, 71b, 71c, and 71d and wirings 72a, 72b, 72c, and 72d of the package substrate, respectively. The differential signals that have propagated to the printed wiring board propagate to alternating current (AC) coupling capacitors 76a, 76b, 76c, and 76d through vias 73a, 73b, 73c, and 73d, wirings 74a, 74b, 74c, and 74d, and vias 75a, 75b, 75c, and 75d, respectively.

Each of the AC coupling capacitors 76a to 76d has a function of removing direct current components of the differential signals. The vias 75a to 75d are coupled to one end of the AC coupling capacitors 76a to 76d and provided in the printed wiring board below the AC coupling capacitors 76a to 76d, respectively.

The differential signals from which direct current components have been removed by the AC coupling capacitors 76a to 76d further propagate to the second electronic component through vias 77a, 77b, 77c, and 77d, wirings 78a, 78b, 78c, and 78d, and vias 79a, 79b, 79c, and 79d, respectively. The vias 77a to 77d are coupled to the other end of the AC coupling capacitors 76a to 76d and provided in the printed wiring board below the AC coupling capacitors 76a to 76d, respectively.

The differential signals that have propagated to the second electronic component propagate to reception circuits 82a and 82b of the semiconductor chip through wirings 80a, 80b, 80c, and 80d, and vias 81a, 81b, 81c, and 81d of the package substrate, respectively.

Figure 11:
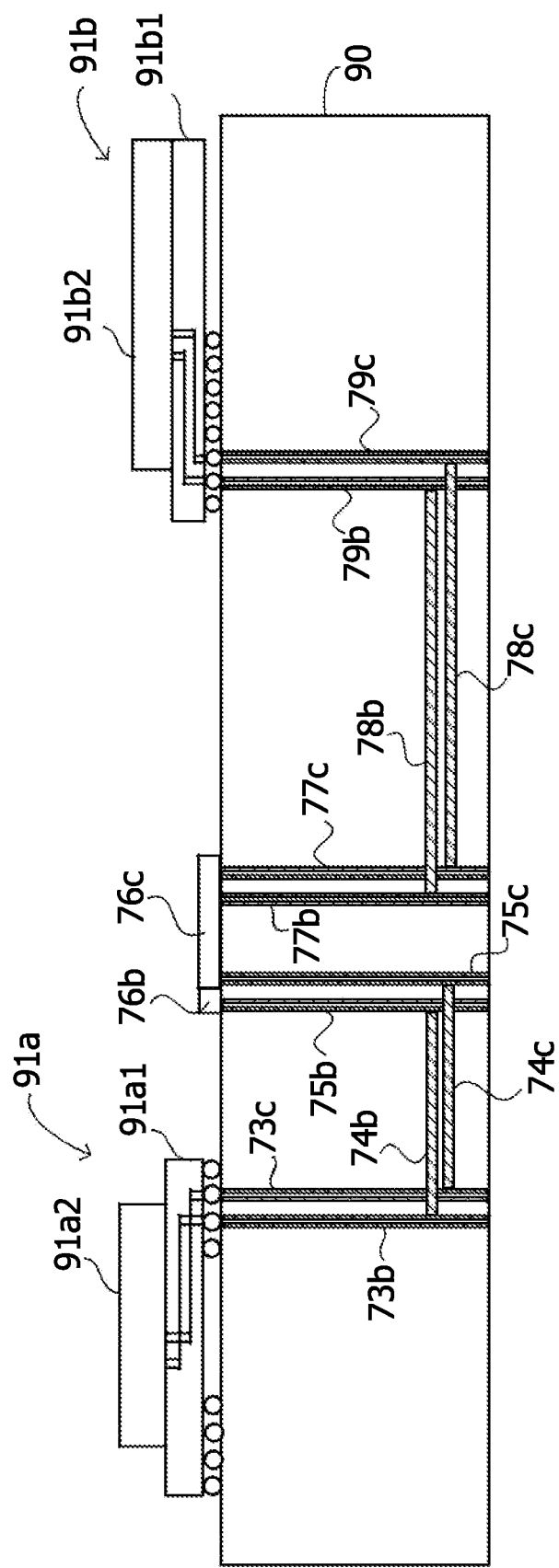
FIG. 11 is a schematic cross-sectional view schematically illustrating a part of FIG. 10.

FIG. 11 is a schematic cross-sectional view schematically illustrating a part of FIG. 10. In FIG. 11, the same elements as the elements illustrated in FIG. 10 are assigned the same reference signs.

Electronic components 91a and 91b are mounted over a printed wiring board 90.

The electronic components 91a and 91b are, for example, BGA packages. The electronic component 91a includes a package substrate 91a1 and a semiconductor chip (die) 91a2, and the electronic component 91b includes a package substrate 91b1 and a semiconductor chip (die) 91b2. The electronic components 91a and 91b are mounted over the printed wiring board 90 with solder bumps that are an example of coupling terminals.

A plurality of vias electrically coupled to the plurality of solder bumps of the electronic components 91a and 91b are formed in the printed wiring board 90 below the electronic components 91a and 91b. FIG. 11 illustrates some of the plurality of vias. The vias 73b and 73c illustrated also in FIG. 10 are formed below the electronic component 91a, and the vias 79b and 79c illustrated also in FIG. 10 are formed below the electronic component 91b.

The vias 75b and 77b coupled to the AC capacitor 76b are formed in the printed wiring board 90 below the AC capacitor 76b. The vias 75c and 77c coupled to the AC capacitor 76c are formed in the printed wiring board 90 below the AC capacitor 76c.

In FIGS. 10 and 11, for example, in a case where the location where crosstalk noise is generated is between the vias 73b and 73c, a wiring length of the wiring 74b or the wiring 74c is adjusted in order to generate crosstalk noise in an opposite phase between the vias 75b and 75c.

In the example of FIG. 10, Ld is added to the wiring 74c as a wiring length difference with respect to the wiring length (L2) before the adjustment of the wiring 74b or 74c. The same Ld is added also to the wiring 74d through which a signal in an opposite phase to that of the wiring 74c propagates.

In FIGS. 10 and 11, for example, in a case where the location where crosstalk noise is generated is between the vias 77b and 77c, a wiring length of the wiring 78b or the wiring 78c is adjusted in order to generate crosstalk noise in an opposite phase between the vias 79b and 79c.

In the example of FIG. 10, Le is added to the wiring 78b as a wiring length difference with respect to the wiring length (L3) before the adjustment of the wiring 78b or 78c. The same Le is added also to the wiring 78a through which a signal in an opposite phase to that of the wiring 78b propagates.

Although variations in the wiring lengths of the two transmission lines may be suppressed by the addition of Le to the wiring 78b instead of the wiring 78c, the crosstalk noise reduction effect may be obtained even though Le is added to the wiring 78c.

In FIG. 10, wiring lengths of the wirings 72a to 72d are denoted by L1 and equal to one another, and wiring lengths of the wirings 80a to 80d are denoted by L4 and equal to one another.

For example, as described above, each of Ld and Le, which is the wiring length difference, is a value obtained by dividing a value of half of the period of the crosstalk noise by a propagation delay time per unit length of a differential signal propagating through the wirings 74a to 74d and the wirings 78a to 78d.

Figure 12:
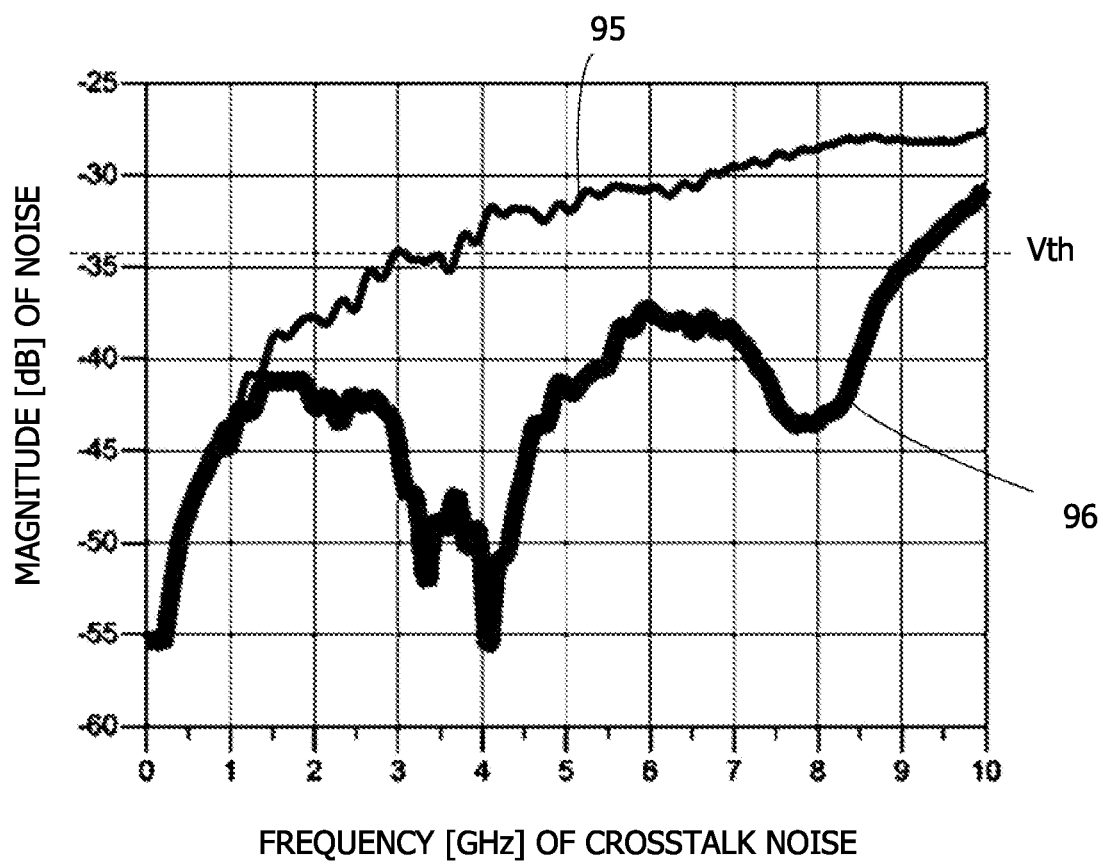
FIG. 12 illustrates an example of a crosstalk noise reduction result.

FIG. 12 is a diagram illustrating an example of a crosstalk noise reduction result. In FIG. 12, the horizontal axis represents a frequency [GHz] of crosstalk noise, and the vertical axis represents a magnitude [dB] of the noise.

A characteristic 95 indicates a characteristic before the crosstalk noise is reduced, and a characteristic 96 indicates a characteristic after the crosstalk noise is reduced.

For example, it is assumed that crosstalk noise having a magnitude equal to or greater than the reference value Vth is generated at two locations between the vias 73b and 73c and between the vias 77b and 77c in FIG. 10, and frequencies of the crosstalk noise desired to be reduced are 4 GHz and 8 GHz.

In this case, for example, the crosstalk noise may be reduced in both the frequency bands by setting Ld as the wiring length difference for reducing the crosstalk noise of 4 GHz and setting Le as the wiring length difference for reducing the crosstalk noise of the 8 GHz, as indicated by the characteristic 96 in FIG. 12. For example, the crosstalk noise may be reduced in a wide range.

Figure 13:
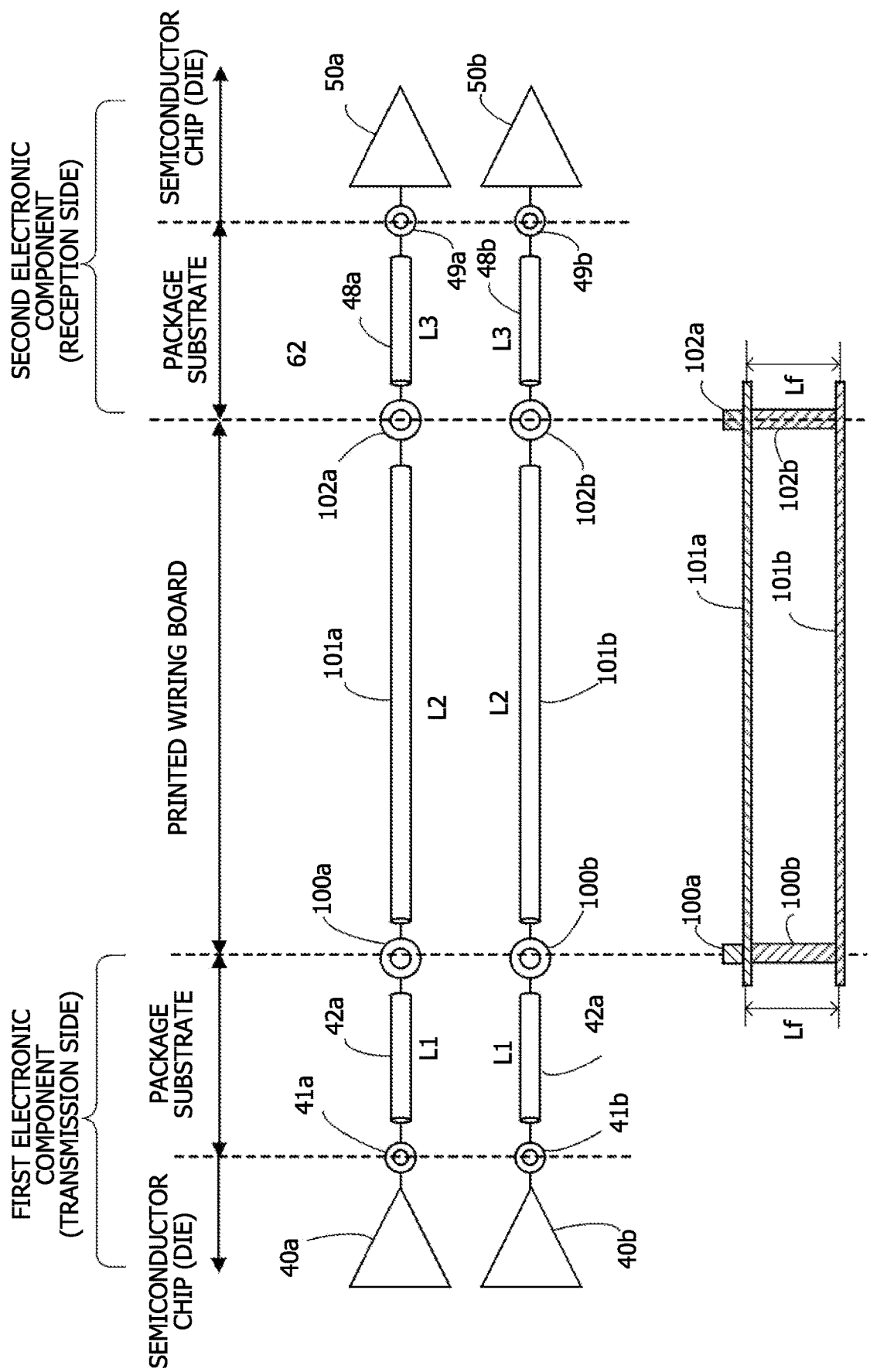
FIG. 13 illustrates another example of cancellation of crosstalk noise without adding vias.

FIG. 13 is a diagram illustrating another example of cancellation of crosstalk noise without adding vias. In FIG. 13, the same elements as the elements illustrated in FIG. 9 are assigned the same reference signs.

It is considered that crosstalk noise is generated between vias 100a and 100b below the first electronic component and crosstalk noise in an opposite phase is generated between vias 102a and 102b below the second electronic component. In this case, there is a possibility that the same effects as those of the above-described examples may be obtained by adjusting via lengths of the vias 100a, 100b, 102a, and 102b.

In the example of FIG. 13, adjustment is performed such that a via length of the via 100b is longer than that of the via 100a by Lf and a via length of the via 102b is longer than that of the via 102a by Lf. In this case, a wiring 101b coupling the vias 100b and 102b to each other is provided on a lower layer side of the printed wiring board with respect to a wiring 101a coupling the vias 100a and 102a to each other. For example, this example corresponds to the adjustment of a thickness (interlayer thickness) between layers in which the wirings 101a and 101b are arranged, respectively.

In this case, for example, as described above, Lf is a value obtained by dividing a value of half of the period of the crosstalk noise by a propagation delay time per unit length of a signal propagating through the vias 100a, 100b, 102a, and 102b and the wirings 101a and 101b.

In a case where it is difficult to perform the adjustment corresponding to the period of the crosstalk noise to be reduced only by the adjustment of the via length (interlayer thickness), it is also possible to adjust the wiring length together with the via length.

Figure 14:
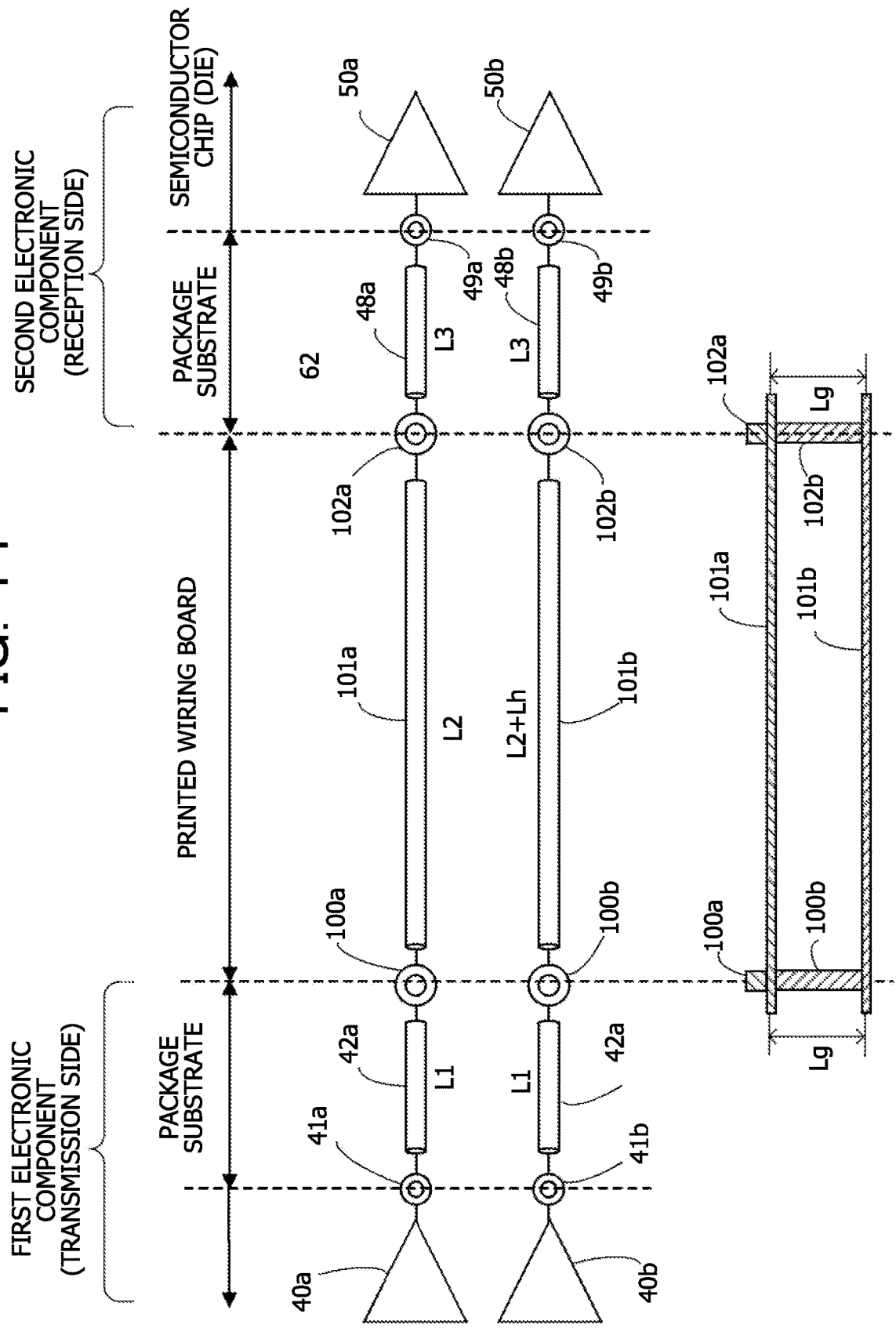
FIG. 14 illustrates an example in which via lengths and wiring lengths are adjusted.

FIG. 14 is a diagram illustrating an example in which via lengths and wiring lengths are adjusted.

In the example of FIG. 14, adjustment is performed such that a via length of the via 100b is longer than that of the via 100a by Lg and a via length of the via 102b is longer than that of the via 102a by Lg. Adjustment is also performed such that a wiring length of the wiring 101b is longer than that of the wiring 101a by Lh.

In this case, for example, as described above, Lg+Lh may be a value obtained by dividing a value of half of the period of the crosstalk noise by a propagation delay time per unit length of a signal propagating through the vias 100a, 100b, 102a, and 102b and the wirings 101a and 101b.

As described above, the above-described processing content may be implemented by causing the design apparatus 20 to execute a program.

The program may be recorded on a computer-readable recording medium (for example, the recording medium 26a). As the recording medium, for example, a magnetic disk, an optical disk, a magneto-optical disk, a semiconductor memory, or the like may be used. Examples of the magnetic disk include an FD and an HDD. Examples of the optical disk include a CD, a CD-recordable (R)/rewritable (RW), a DVD, and a DVD-R/RW. The program may be recorded in a portable recording medium and may be distributed. In this case, the program may be copied from the portable recording medium to another recording medium (for example, the HDD 23) and may be executed.

Although an aspect of the design program, the design method, and the printed wiring board of the present disclosure has been described above based on the embodiments, these are merely examples and are not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a design program for causing a computer to execute a process, the process comprising:
   selecting, based on design data of a printed wiring board stored in a storage unit, a first transmission line and a second transmission line among a plurality of transmission lines provided in the printed wiring board;
   adjusting a first wiring length between a first via included in the first transmission line and a third via included in the first transmission line, a second wiring length between a second via included in the second transmission line and a fourth via included in the second transmission line, a length of the first via, a length of the second via, a length of the third via, or a length of the fourth via such that a phase of first crosstalk noise generated between the first via and the second via is inverted between the third via and the fourth via; and
   outputting the design data corrected based on the adjustment in the printed wiring board.

2. The non-transitory computer-readable recording medium according to claim 1, the process further comprising:
   adjusting the first wiring length or the second wiring length such that a value obtained by dividing a value of half of a period of the first crosstalk noise by a propagation delay time per unit length of a signal propagating between the first via and the third via or between the second via and the fourth via is a difference between the first wiring length and the second wiring length.

3. The non-transitory computer-readable recording medium according to claim 1, the process further comprising:
   providing the first via and the second via adjacently to each other in the printed wiring board below a first electronic component mounted over the printed wiring board;
   adding the third via to the first transmission line; and
   adding the fourth via adjacent to the third via to the second transmission line.

4. The non-transitory computer-readable recording medium according to claim 1, wherein
   the first via and the second via are provided adjacently to each other in the printed wiring board below a first electronic component mounted over the printed wiring board, and
   the third via and the fourth via are provided adjacently to each other in the printed wiring board below a second electronic component mounted over the printed wiring board.

5. The non-transitory computer-readable recording medium according to claim 1, wherein
   the first transmission line includes a first capacitor,
   the second transmission line includes a second capacitor,
   a via coupled to a first end of the first capacitor is the third via, and
   a via coupled to a first end of the second capacitor is the fourth via.

6. The non-transitory computer-readable recording medium according to claim 5, the process further comprising:
   adjusting a third wiring length between a fifth via coupled to a second end of the first capacitor and a seventh via included in the first transmission line and a fourth wiring length between a sixth via coupled to a second end of the second capacitor and an eighth via included in the second transmission line such that a phase of second crosstalk noise generated between the fifth via and the sixth via is inverted between the seventh via and the eighth via.

7. The non-transitory computer-readable recording medium according to claim 1, wherein
   the first transmission line and the second transmission line in which a magnitude of the first crosstalk noise generated between the first via and the second via is equal to or greater than a reference value are selected.

8. The non-transitory computer-readable recording medium according to claim 2, the process further comprising:
   identifying the period.

9. A computer-implemented design method comprising:
   selecting, based on design data of a printed wiring board stored in a storage device, a first transmission line and a second transmission line among a plurality of transmission lines provided in the printed wiring board;
   adjusting a first wiring length between a first via included in the first transmission line and a third via included in the first transmission line, a second wiring length between a second via included in the second transmission line and a fourth via included in the second transmission line, a length of the first via, a length of the second via, a length of the third via, or a length of the fourth via such that a phase of first crosstalk noise generated between the first via and the second via is inverted between the third via and the fourth via; and
   outputting the design data corrected based on the adjustment in the printed wiring board.

10. A printed wiring board comprising:
    a first transmission line;
    a second transmission line;
    a first via and a third via included in the first transmission line;
    a second via and a fourth via included in the second transmission line;
    a first wiring between the first via and the third via; and
    a second wiring between the second via and the fourth via,
    wherein a length of the first wiring, the second wiring, the first via, the second via, the third via, or the fourth via is arranged by adjusting such that a phase of crosstalk noise generated between the first via and the second via is inverted between the third via and the fourth via.

* * * * *